(12) United States Patent
Ciarafoni et al.

(10) Patent No.: US 8,835,568 B2
(45) Date of Patent: Sep. 16, 2014

(54) PROPYLENE POLYMER COMPOSITIONS

(75) Inventors: Marco Ciarafoni, Ferrara (IT); Paola Massari, Ferrara (IT); Claudio Cavalieri, Ferrara (IT); Tiziana Caputo, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 13/696,014

(22) PCT Filed: Apr. 6, 2011

(86) PCT No.: PCT/EP2011/055341
§ 371 (c)(1),
(2), (4) Date: Dec. 3, 2012

(87) PCT Pub. No.: WO2011/138111
PCT Pub. Date: Nov. 10, 2011

(65) Prior Publication Data
US 2013/0072634 A1    Mar. 21, 2013

Related U.S. Application Data

(60) Provisional application No. 61/395,122, filed on May 7, 2010.

(30) Foreign Application Priority Data

May 5, 2010    (EP) ..................................... 10162007

(51) Int. Cl.
| | | |
|---|---|---|
| C08L 23/04 | (2006.01) | |
| C08L 23/10 | (2006.01) | |
| C08F 8/00 | (2006.01) | |
| C08L 23/16 | (2006.01) | |
| C08F 297/08 | (2006.01) | |
| C08L 23/14 | (2006.01) | |
| C08L 23/08 | (2006.01) | |

(52) U.S. Cl.
CPC ............. *C08L 23/16* (2013.01); *C08L 23/0815* (2013.01); *C08F 297/083* (2013.01); *C08L 2308/00* (2013.01); *C08L 23/08* (2013.01); *C08L 23/142* (2013.01)

USPC ............ 525/191; 525/240; 524/515; 524/525

(58) Field of Classification Search
USPC .......................... 525/191, 240; 524/515, 525
See application file for complete search history.

(56) References Cited

U.S. PATENT DOCUMENTS

| | | | |
|---|---|---|---|
| 4,399,054 A | | 8/1983 | Ferraris et al. |
| 4,469,648 A | | 9/1984 | Ferraris |
| 5,258,464 A | * | 11/1993 | McCullough et al. ........ 525/244 |
| 6,162,872 A | * | 12/2000 | Berta ............................ 525/240 |
| 6,248,833 B1 | * | 6/2001 | Colucci et al. ................ 525/191 |

FOREIGN PATENT DOCUMENTS

| | | |
|---|---|---|
| EP | 045977 | 2/1982 |
| EP | 0361494 | 4/1990 |
| EP | 0373660 | 6/1990 |
| EP | 0395083 | 10/1990 |
| EP | 0603723 | 6/1994 |
| EP | 0728769 | 8/1996 |
| EP | 0782587 | 8/1996 |
| EP | 1272533 | 9/2008 |
| WO | WO-98/44001 | 10/1998 |
| WO | WO-0002929 | 1/2000 |
| WO | WO-0063261 | 10/2000 |
| WO | WO-2004011507 | 2/2004 |
| WO | WO-2006037705 | 4/2006 |
| WO | WO-2008012144 | 1/2008 |
| WO | WO-2011045194 | 4/2011 |

* cited by examiner

*Primary Examiner* — Nathan M Nutter

(57) ABSTRACT

A propylene polymer composition comprising (percent by weight):

A) 65%-85% of a propylene copolymer containing from 2.0% to 5.0% of ethylene derived units having MFR L (Melt Flow Rate according to ASTM 1238, condition L, i.e. 230° C. and 2.16 kg load) from 0.5 to 50 g/10 min and a melting temperature Tm ranging from 146° C. to 155° C.;

B) 15%-35%, of a copolymer of ethylene and propylene with from 74% to 87%, of ethylene derived units;

the composition having the intrinsic viscosity of the fraction soluble in xylene ranging from 0.8 to 1.2 dl/g preferably from 0.9 to 1.1 dl/g.

8 Claims, No Drawings

PROPYLENE POLYMER COMPOSITIONS

This application is the U.S. national phase of International Application PCT/EP2011/055341, filed Apr. 6, 2011, claiming priority to European Patent Application 10162007.8 filed May 5, 2010, and the benefit under 35 U.S.C. 119(e) of U.S. Provisional Application No. 61/395,122, filed May 7, 2010; the disclosures of International Application PCT/EP2011/055341, European Patent Application 10162007.8 and U.S. Provisional Application No. 61/395,122, each as filed, are incorporated herein by reference.

The present invention relates to a propylene polymer composition having an optimum balance of properties in particular excellent optical properties.

As is known, the isotactic polypropylene is endowed with an exceptional combination of excellent properties which render it suitable for a very great number of uses. In order to improve said properties into the propylene stereoregular homopolymerization process have been introduced one or more copolymerization steps or one or more monomer have been introduced in the homopolymer matrix.

WO 2006/037705 relates to an olefin polymer composition comprising (by weight, unless otherwise specified):
A) 60-85%, preferably 65-80%, more preferably 65-75%, of a crystalline propylene homopolymer or a crystalline copolymer of propylene containing 3% or less of ethylene or $C_4$-$C_{10}$ a-olefin(s) or of combinations thereof, said homopolymer or copolymer having a Polydispersity Index (P.I.) value of from 4.5-6, preferably 4.5-5.5, and a content of isotactic pentads (mmmm), measured by $^{13}C$ NMR on the fraction insoluble in xylene at 25° C., higher than 96%, preferably higher than 98%;
B) 15-40%, preferably 20-35%, more preferably 25-35%, of a partially amorphous copolymer of ethylene containing from 35% to 70%, preferably from 40 to 55%, of propylene or $C_4$-$C_{10}$ a-olefin(s) or of combinations thereof, and optionally minor proportions of a diene. The olefin polymer composition exhibits a value of elongation at break ranging from 150 to 600%, preferably 200-500%, according to IS0 method 527.

EP 603 723 relates to a polypropylene compositions comprising:
A) from 70 to 98 parts by weight of a crystalline propylene homopolymer, or a crystalline random copolymer of propylene with ethylene and/or $C_4$-$C_{10}$ alpha-olefins, containing from 0.5 to 10% by weight of ethylene and/or a-olefins (Fraction A); and
B) from 2 to 30 parts by weight of elastomeric copolymer of ethylene with one or more $C_4$-$C_{10}$ a-olefins, containing from 60 to 85% by weight of ethylene, and partially soluble in xylene at 25° C. (Fraction B);
Wherein said composition has an intrinsic viscosity value in tetrahydronaphthalene at 135° C. of the fraction soluble in xylene at 25° C. ranging from 0.8 to 1.1 dl/g.

The applicant found that the properties of these compositions, especially in terms of transparency, elongation at break and hexane extractables can be improved by using the composition of the present invention.

The object of the present invention is a propylene polymer composition comprising (percent by weight):
A) 65%-85%, preferably 70%-80%, more preferably 70%-75%, of a propylene copolymer containing from 2.0% to 5.0% preferably from 3.0% to 4.5% more preferably from 3.2% to 4.0% of ethylene derived units, said propylene copolymer having MFR L (Melt Flow Rate according to ASTM 1238, condition L, i.e. 230° C. and 2.16 kg load) from 0.5 to 50 10 g/10 min and a melting temperature Tm ranging from 146° C. to 155° C. preferably from 147° C. to 154° C., preferably from 149° C. to 153° C.;
B) 15%-35%, preferably 20%-30%, more preferably 25%-30% of a copolymer of ethylene and propylene with from 74% to 87%, preferably from 77% to 85%, more preferably from 79% to 82%; of ethylene derived units;
the composition having the intrinsic viscosity (IV) of the fraction soluble in xylene ranging from 0.8 to 1.2 dl/g preferably from 0.9 to 1.1 dl/g.

From the above definitions it is evident that the term "copolymer" includes polymers containing only two kinds of comonomers.

Other preferred features for the compositions of the present invention are:
crystallization temperature Tc ranging from 95° C. to 120° C.;
MFR L (Melt Flow Rate according to ASTM 1238, condition L, i.e. 230° C. and 2.16 kg load) from 10 to 50 g/10 min, in particular from 15 to 40 g/10 min.; more preferably more preferably from 20 to 35 10 g/10 min;
Haze measured on 1 mm plaques lower than 22%; preferably lower than 21%; even more preferably lower than 20%;
Flexural modulus (determined according to IS0 178) comprised between 800 MPa and 1500 MPa, preferably from 850 MPa and 1300 MPa; more preferably from 900 MPa and 1200 MPa;
Ductile brittle temperature lower than −15° C., preferably lower than −20° C., more preferably lower than −25° C.
elongation at break ranging from 650% to 1200%, preferably from 800% to 1100%, more preferably from 850% and 1000% measured according to IS0 method 527.

The propylene polymer compositions of the present invention can be prepared by sequential polymerization in at least two stages, with each subsequent polymerization stage being conducted in the presence of the polymeric material formed in the immediately preceding polymerization reaction, wherein the copolymer (A) is normally prepared in at least one first polymerization stage and the copolymer (B) is normally prepared in at least one second polymerization stage. Preferably, each polymerization stage is carried out in presence of a highly stereospecific heterogeneous Ziegler-Natta catalyst. The Ziegler-Natta catalysts suitable for producing the propylene polymer compositions of the invention comprise a solid catalyst component comprising at least one titanium compound having at least one titanium-halogen bond and at least an electron-donor compound (internal donor), both supported on magnesium chloride. The Ziegler-Natta catalysts systems further comprise an organo-aluminum compound as essential co-catalyst and optionally an external electron-donor compound.

Suitable catalysts systems are described in the European patents EP45977, EP361494, EP728769, EP 1272533 and in the international patent application WO00163261.

Preferably, the solid catalyst component comprises Mg, Ti, halogen and an electron donor selected from succinates of formula (I):

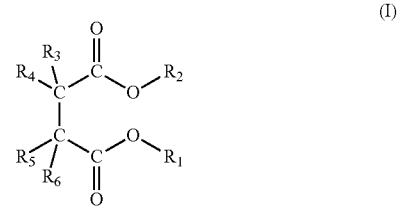

wherein the radicals $R^1$ and $R^2$, equal to or different from each other, are a $C_1$-$C_{20}$ linear or branched alkyl, alkenyl, cycloalkyl, aryl, arylalkyl or alkylaryl group, optionally containing heteroatoms belonging to groups 15-17 of the periodic table; the radicals $R^3$ to $R^6$ equal to or different from each other, are hydrogen or a $C_1$-$C_2$ linear or branched alkyl, alkenyl, cycloalkyl, aryl, arylalkyl or alkylaryl group, optionally containing heteroatoms, and the radicals $R^3$ to $R^6$ which are joined to the same carbon atom can be linked together to form a cycle.

$R^1$ and $R^2$ are preferably $C_1$-$C_8$ alkyl, cycloalkyl, aryl, arylalkyl and alkylaryl groups.

Particularly preferred are the compounds in which $R^1$ and $R^2$ are selected from primary alkyls and in particular branched primary alkyls. Examples of suitable $R^1$ and $R^2$ groups are methyl, ethyl, n-propyl, n-butyl, isobutyl, neopentyl, 2-ethylhexyl. Particularly preferred are ethyl, isobutyl, and neopentyl.

One of the preferred groups of compounds described by the formula (I) is that in which $R^3$ to $R^5$ are hydrogen and $R^6$ is a branched alkyl, cycloalkyl, aryl, arylalkyl and alkylaryl radical having from 3 to 10 carbon atoms. Another preferred group of compounds within those of formula (I) is that in which at least two radicals from $R^3$ to $R^6$ are different from hydrogen and are selected from $C_1$-$C_{20}$ linear or branched alkyl, alkenyl, cycloalkyl, aryl, arylalkyl or alkylaryl group, optionally containing heteroatoms belonging to groups.

Particularly preferred are the compounds in which the two radicals different from hydrogen are linked to the same carbon atom. Furthermore, also the compounds in which at least two radicals different from hydrogen are linked to different carbon atoms, that is $R^3$ and $R^5$ or $R^4$ and $R^6$ are particularly preferred.

According to a preferred method, the solid catalyst component can be prepared by reacting a titanium compound of formula Ti(OR)$_{n-y}$X$_y$ where n is the valence of titanium and y is a number between 1 and n, preferably TiCl$_4$, with a magnesium chloride deriving from an adduct of formula MgCl$_2$.pROH, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Examples of spherical adducts prepared according to this procedure are described in U.S. Pat. Nos. 4,399,054 and 4,469,648. The so obtained adduct can be directly reacted with the Ti compound or it can be previously subjected to thermal controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold TiCl$_4$ (generally 0° C.); the mixture is heated up to 80-130° C. and kept at this temperature for 0.5-2 hours. The treatment with TiCl$_4$ can be carried out one or more times. The internal donor can be added during the treatment with TiCl$_4$ and the treatment with the electron donor compound can be repeated one or more times. Generally, the succinate of formula (I) is used in molar ratio with respect to the MgCl$_2$ of from 0.01 to 1 preferably from 0.05 to 0.5. The preparation of catalyst components in spherical form is described for example in European patent application EP-A-395083 and in the International patent application WO98144001. The solid catalyst components obtained according to the above method show a surface area (by B.E.T. method) generally between 20 and 500 ml/g and preferably between 50 and 400 ml/g, and a total porosity (by B.E.T. method) higher than 0.2 cm$^3$/g preferably between 0.2 and 0.6 cm$^3$/g. The porosity (Hg method) due to pores with radius up to 10.000 A generally ranges from 0.3 to 1.5 cm$^3$/g, preferably from 0.45 to 1 cm$^3$/g.

The organo-aluminum compound is preferably an alkyl-Al selected from the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as AlEt$_2$Cl and Al$_2$Et$_3$Cl$_3$.

Preferred external electron-donor compounds include silicon compounds, ethers, esters such as ethyl 4-ethoxybenzoate, amines, heterocyclic compounds and particularly 2,2,6,6-tetramethyl piperidine, ketones and the 1,3-diethers. Another class of preferred external donor compounds is that of silicon compounds of formula $R_a^5 R_b^6 Si(OR^7)_c$ where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. Particularly preferred are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1,trifluoropropyl-2-ethylpiperidinyl-dimethoxysilane and 1,1,1, trifluoropropyl-metildimethoxysilane. The external electron donor compound is used in such an amount to give a molar ratio between the organo-aluminum compound and said electron donor compound of from 0.1 to 500.

The propylene copolymer A is obtainable by polymerizing propylene and ethylene by a gas-phase polymerization process carried out in at least two interconnected polymerization zones, the process comprising feeding propylene and the at least one linear or branched alpha-olefin having 2 to 8 carbon atoms other than propylene to said polymerization zones in the presence of a highly stereospecific heterogeneous Ziegler-Natta catalyst system under reaction conditions and collecting the polymer product from said polymerization zones, in which process the growing polymer particles flow upward through one of said polymerization zones (riser) under fast fluidization conditions, leave said riser and enter another polymerization zone (downcomer) through which they flow downward under the action of gravity, leave said downcomer and are reintroduced into the riser, thus establishing a circulation of polymer between the riser and the downcomer, whereby means are provided which are capable of totally or partially preventing the gas mixture present in the riser from entering the downcomer and a gas and/or liquid mixture having a composition different from the gas mixture present in the riser is introduced into the downcomer.

In the polymerization process, the growing polymer flows through a first polymerization zone, represented by the riser, under fast fluidization conditions. The two polymerization zones are appropriately interconnected. The growing polymer and the gaseous mixture leaving the riser are conveyed to a separation zone whereby the gaseous mixture is separated from the growing polymer. From the separation zone, the growing polymer enters the second polymerization zone, represented by the downcomer, where the growing polymer flows in a densified form under the action of gravity. The growing polymer particles leave said second polymerization zone and are reintroduced into said first polymerization zone, thus establishing a circulation of polymer between the two polymerization zones. The material balance is maintained by feeding in monomers and catalysts and discharging polymer powder. Generally, the conditions of fast fluidization in the first polymerization zone is established by feeding the monomers gas mixture below the point of reintroduction of the growing polymer into said first polymerization zone. The velocity of the transport gas injected into the riser has to be higher than the transport velocity under the operating conditions, and depends on the gas density and the particle size distribution of the solid. It is preferably comprised between 0.5 and 15 m/s, more preferably between 0.8 and 5 m/s. Generally, the various catalyst components are fed to the riser through a line that is preferably placed in the lower part of the riser. However, they can be fed at any other point of the riser, as well as at any point of the downcomer or of the interconnecting sections. The gas mixture that is separated from the circulating solid in the separation zone must be totally or partially prevented to enter the downcomer. This can be achieved by feeding a gas and/or liquid into the downcomer through a line placed at a suitable point of said downcomer, preferably in the upper part thereof, through one or more introduction lines. The gas and/or liquid mixture to be fed into the downcomer should have an appropriate composition, different from that of the gas mixture present in the riser. The said gas and/or liquid mixture partially or totally replaces the gas mixture entrained with the polymer particles entering the downcomer. The flow rate of this gas feed can be regulated so that a flow of gas counter-current to the flow of polymer particles is originated in the downcomer, particularly at the top thereof, thus acting as a barrier to the gas mixture coming from the riser which is entrained among the polymer particles. According to a particularly preferred embodiment, the gas and/or liquid mixture of different composition to be fed into the downcomer is fed in partially or totally liquefied form. More preferably, said gas and/or liquid mixture consists of liquefied propylene.

Optionally, one or more inert gases, such as nitrogen or an aliphatic hydrocarbon, are maintained in the polymerization zones, in such quantities that the sum of the partial pressures of the inert gases is preferably between 5 and 80% of the total pressure of the gases. The operating parameters such as, for example, the temperature are those that are usual in gas-phase olefin polymerization processes, for example between 50° C. and 120° C., preferably from 70° C. to 90° C. The process can be carried out under operating pressure of between 0.5 and 10 MPa, preferably between 1.5 and 6 MPa. The polymerization apparatus suitable for carrying out the process is described in details in the International Patent Application WO00/02929, in particular in FIG. 4. The molecular weight distribution of the growing polymers can be conveniently tailored by metering customary molecular weight regulators, particularly hydrogen, in different proportion into at least one polymerization zone, preferably into the riser. The process for the production of copolymer (A) is described in WO 2008/012144.

Polymer (B) is obtained by a polymerization in a gas phase in the presence of copolymer (A) without intermediate stages except for the partial degassing of the monomers. The reaction time, temperature and pressure of the polymerization steps are not critical, however the temperature for the preparation of fraction (A) and (B), that can be the same or different, is usually from 50° C. to 120° C. The polymerization pressure preferably ranges from 0.5 to 12 MPa if the polymerization is carried out in gas-phase. The catalytic system can be pre-contacted (pre-polymerized) with small amounts of olefins. The molecular weight of the propylene polymer composition is regulated by using known regulators, such as hydrogen.

In the second stage of the particularly preferred polymerization process, the ethylene/propylene copolymer (B) is produced in a conventional fluidized-bed gas-phase reactor in the presence of the polymeric material and the catalyst system coming from the preceding polymerization step. The polymerization mixture is discharged from the downcomer to a gas-solid separator, and subsequently fed to the fluidized-bed gas-phase reactor operating under conventional conditions of temperature and pressure.

The propylene polymer compositions of the present invention can also be obtained by separately preparing the said copolymers (A) and (B), operating with the same catalysts and substantially under the same polymerization conditions as previously illustrated and subsequently mechanically blending said copolymers in the molten state using conventional mixing apparatuses, like twin-screw extruders.

The propylene polymer compositions of the present invention may further comprise additives commonly employed in the polyolefin field, such as antioxidants, light stabilizers, nucleating agents, antiacids, colorants and fillers.

The main application of the propylene polymer compositions of the invention is the production of molded articles, particularly injection-molded items and films. The injection-molded articles comprising the propylene polymer compositions of the invention have good flexibility and good impact properties and are also endowed with good transparency.

The following examples are given to illustrate and not to limit the present invention.

EXAMPLES

The data of the propylene polymer materials were obtained according to the following methods:

Xylene-Soluble Faction 2.5 g of polymer and 250 ml of o-xylene are introduced in a glass flask equipped with a refrigerator and a magnetical stirrer. The temperature is raised in 30 minutes up to the boiling pint of the solvent. The so obtained solution is then kept under reflux and stirring for further 30 minutes. The closed flask is then kept for 30 minutes in a bath of ice and water and in thermostatic water bath at 25° C. for 30 minutes as well. The solid thus obtained is filtered on quick filtering paper and the filtered liquid is divided into two 100 ml aliquots. One 100 ml aliquots of the filtered liquid is poured in a previously weighed aluminum container, which is heated on a heating plate under nitrogen flow, to remove the solvent by evaporation. The container is then kept on an oven at 80° C. under vacuum until constant weight is obtained. The residue is weighed to determine the percentage of xylene-soluble polymer.

Ethylene (C2) Content

By IR spectroscopy.

The comonomer content of the Component B is determined on the precipitated "amorphous" fraction of the polymer. The precipitated "amorphous" fraction is obtained as follows: to one 100 ml aliquot of the filtered liquid obtained as described above (procedure for the Xylene-soluble faction) 200 ml of acetone are added under vigorous stirring. Precipitation must be complete as evidenced by a clear solid-solution separation. The solid thus obtained is filtered on a tared metallic screen and dried in a vacuum oven at 70° C. until a constant weight is reached.

Molar Ratio of Feed Gasses

Determined by gas-chromatography

Melt Flow Rate (MFR)

Determined according to ISO 1133 (230° C., 2.16 Kg)

Intrinsic Viscosity
   Determined in tetrahydronaphthalene at 135° C.
Flexural Modulus
   Determined according to ISO 178
Stress at Yield and at Break
   Determined according to ISO 527
Elongation at Yield and Break
   Determined according to ISO 527
IZOD Impact Strength
   Determined according to ISO 18011A
Ductile/Brittle Transition Temperature (D/B)
   According to this method, the bi-axial impact resistance is determined through impact with an automatic, computerized striking hammer.
   The circular test specimens are obtained by cutting with circular hand punch (38 mm diameter). They are conditioned for at least 12 hours at 23° C. and 50 RH and then placed in a thermostatic bath at testing temperature for 1 hour. The force-time curve is detected during impact of a striking hammer (5.3 kg, hemispheric punch with a ½" diameter) on a circular specimen resting on a ring support. The machine used is a CEAST 67581000 type model no. 2.
   D/B transition temperature is the temperature at which 50% of the samples undergoes fragile break when submitted to the above-mentioned impact test. The plaques for D/B measurements, having dimensions of 127×127×1.5 mm are prepared according to the following method.
   The injection press is a Negri Bossi™ type (NB 90) with a clamping force of 90 tons. The mould is a rectangular plaque (127×127×1.5 mm).
The main process parameters are reported below:
Back pressure (bar): 20
Injection time (s): 3
Maximum Injection pressure (MPa): 14
Hydraulic injection pressure (MPa): 6-3
First holding hydraulic pressure (MPa): 4±2
First holding time (s): 3
Second holding hydraulic pressure (MPa): 3±2
Second holding time (s): 7
Cooling time (s): 20
Mould temperature (° C.): 60
The melt temperature is between 220 and 280° C.
Haze (on 1 mm plaque)
   According to the method used, 5×5 cm specimens are cut molded plaques of 1 mm thick and the haze value is measured using a Gardner photometric unit connected to a Hazemeter type UX-10 or an equivalent instrument having G.E. 1209 light source with filter "C". Reference samples of known haze are used for calibrating the instrument. The plaques to be tested are produced according to the following method.
   75×75×1 mm plaques are molded with a GBF Plastiniector G235190 Injection Molding Machine, 90 tons under the following processing conditions:
Screw rotation speed: 120 rpm
Back pressure: 10 bar
Melt temperature: 260° C.
Injection time: 5 sec
Switch to hold pressure: 50 bar
First stage hold pressure: 30 bar
Second stage pressure: 20 bar
Hold pressure profile: First stage 5 sec
Second stage 10 sec
   Cooling time: 20 sec
Mold water temperature: 40° C.

Hexane Extractable
   The hexane extractable fraction is determined according to modified FDA method (federal registration, title 21, Chapter 1, part 177, section 1520, s Annex B) on polymer formed into 100 nm thick items.
Melting Temperature, Melting Enthalpy and Crystallization Temperature
   Determined by DSC with a temperature variation of 20° C. per minute Example 1

Polymerization Equipment
   The propylene polymer compositions of the example were prepared in a two-step polymerization process, wherein the copolymer (A) was prepared in the first polymerization step by feeing the monomers and the catalyst system to a gas-phase polymerization reactor comprising two interconnected polymerization zones, a riser and a downcomer, as described in the European Patent EP782587. The polymerization mixture was discharged from said reactor, conveyed to a gas-solid separator and the polymerized material was sent into a conventional gas-phase fluidized-bed reactor where the ethylene/propylene copolymer (B) was produced. The operative conditions are indicated in Table 1.

Example 1

The solid catalyst used to prepare the propylene polymers was prepared according to the Example 5, lines 48-55 of the European Patent EP728769. Triethylaluminium (TEAL) was used as co-catalyst and dicyclopentyldimethoxysilane as external donor. The propylene polymers were prepared by feeding the monomers and the catalyst system to the polymerization equipment indicated above. The polymer powders were subjected to a steam treatment to remove the unreacted monomers, dried and subject to the analysis. and the results analysis of the obtained polymer are indicated in table 1.
   On Table 2 are reported the characterization data measured on the compositions obtained by mixing the polymer powders of the Example 1 with (percentage by weight the sum of the additives+the propylene polymer composition being 100) 0.18% of Millad 3988
   0.05% of GMS 90; 0.05% of Ca stearate and 0.15% o finorganox B215 and extruded in a twin-screw extruder Berstorff (L/D=33) under the following operating conditions:
Temperature of the feeding section: 190-210° C.
Melt temperature: 240° C.
Temperature of the die section: 230° C.
Flow rate: 16 Kg/h
Rotational speed: 250 rpm

TABLE 1

|  |  | Example | | |
|---|---|---|---|---|
|  |  | 1 | Comp 1 | Comp 2 |
| Component A) (reactor MZCR) |  |  |  |  |
| TEAL/external donor | wt/wt | 3 | 3 | 3 |
| TEAL/catalyst | wt/wt | 5 | 5 | 5 |
| Temperature | ° C. | 75 | 75 | 75 |
| Pressure | bar-g | 27 | 27 | 27 |
| Split holdup riser | wt % | 35 | 40 | 35 |
| C2/C2 + C3-riser/downer | mol/mol | 0.029 |  | 0.033 |
| $H_2/C_3$ riser | mol/mol | 0.12 | 0.11 | 0.11 |
| MFR | g/10 min | 32 | 38 | 35 |
| XS | wt % | 4.8 | 5 | 4.8 |

TABLE 1-continued

|  |  | Example | | |
|---|---|---|---|---|
|  |  | 1 | Comp 1 | Comp 2 |
| PI |  | 4.1 | 4.1 | 4.1 |
| C2 | wt % | 3.1 | 3.1 | 3.1 |
| Component B (gas phase reactor) |  |  |  |  |
| Temperature | °C. | 80 | 80 | 80 |
| Pressure | MPa | 2 | 2.1 | 2 |
| Split * | % | 25 | 25 | 26 |
| $C_2/C_2 + C_3$ | mol/mol | 0.71 | 0.72 | 0.63 |
| $H_2/C^-$ | mol/mol | 0.500 | 0.285 | 0.400 |

C2 = ethylene
C3 = propylene
XS = xylene solubles

The properties measured on the samples are collected in Table 2.

TABLE 2

|  |  | example | | |
|---|---|---|---|---|
|  |  | 1 | Comp 1 | Comp 2 |
| Component A |  |  |  |  |
| MFR | g/10' | 25-35 | 35-45 | 35-45 |
| C2 | % | 3.4 | 3.4 | 3.1 |
| XS | % | 5.3 | 5.3 | 4.8 |
| Component B |  |  |  |  |
| % split (amount of polymer B) | % | 25-27 | 25 | 26 |
| % C2 content | % | 80 | 73 | 68 |
| Properties of the composition |  |  |  |  |
| C2 tot | % | 26.1 | 22.8 | 20.4 |
| XS | % | 17.7 | 19.8 | 20.9 |
| XSIV | dl/g | 1.08 | 1.50 | 1.33 |
| MFR | g/10' | 29 | 23 | 29 |
| Flexural Modulus | Mpa | 910 | 870 | 890 |
| Haze (on plaque 1 mm) | % | 18.8 | 23.4 | 35 |
| Stress at yield | Mpa | 21.2 | 20.5 | 20 |
| Elongation at break | % | 660 | 603 | 507 |
| D/B TT | °C. | −29 | −37 | −40 |
| Tm | °C. | 150.2 | 151 | 151.5 |
| Tc | °C. | 116.2 | 116.9 | 117.1 |
| n-Hexane extrables (on Film) | % | 4.0 | 4.2 | 5.5 |

XSIV = xylene soluble fraction
C2 = ethylene
C3 = propylene

Table 2 shows that the composition according to the present invention shows a better haze value, flexural modulus and elongation at break than that one of the comparative examples having component B) poorer in ethylene.

The invention claimed is:

1. A propylene polymer composition comprising (percent by weight):
   A) 65%-85% of a propylene copolymer containing from 2.0% to 5.0% of ethylene derived units having MFR L (Melt Flow Rate according to ASTM 1238, condition L,) from 0.5 to 50 g/10 min and a melting temperature Tm ranging from 146° C. to 155° C.; and
   B) 15%-35%, of a copolymer of ethylene and propylene, wherein component B) has an ethylene content from 74% to 87%;
   the composition having an intrinsic viscosity of a fraction soluble in xylene ranging from 0.8 to 1.2 dl/g, and an elongation at break ranging from 650% to 1200%.

2. The propylene polymer composition according to claim 1 wherein (percent by weight) component A ranges from 70% to 80%, and component B) ranges from 20% to 30%.

3. The propylene polymer composition according to claim 1 wherein (percent by weight) component A) has an ethylene content ranging from 3.0% to 4.5%.

4. The propylene polymer composition according to claim 1 wherein (percent by weight) component B) has an ethylene content ranging from 77% to 85%.

5. The propylene polymer composition according to claim 1 wherein the melting temperature of component A) is from 147° C. to 154° C.

6. The propylene polymer composition according to claim 1 wherein the propylene polymer composition has a crystallization temperature Tc ranging from 95° C. to 120° C.

7. The propylene polymer composition according to claim 1 wherein the MFR L (Melt Flow Rate according to ASTM 1238, condition L) ranges from 10 to 50 g/10 min.

8. The propylene polymer composition according to claim 1 wherein the Haze measured on 1 mm plaques is lower than 22%.

* * * * *